(No Model.)
W. A. FEGELEY.
SHAFT SUPPORT.
No. 426,991. Patented Apr. 29, 1890.
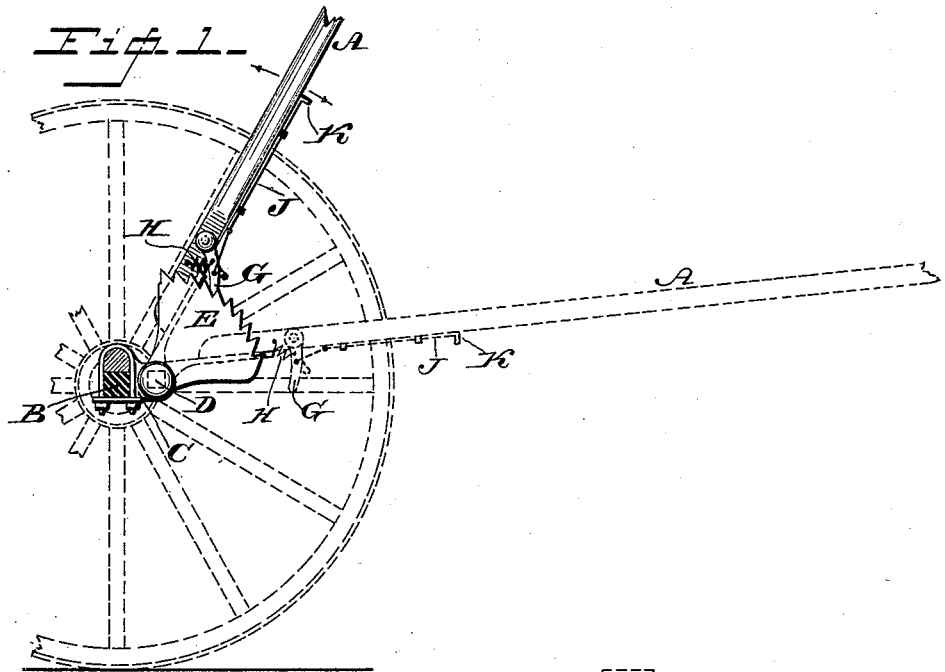
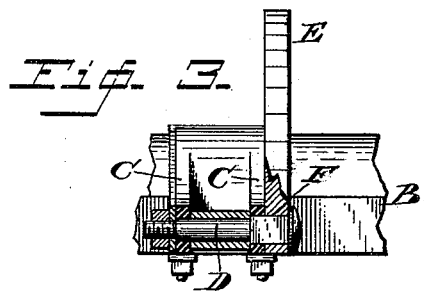
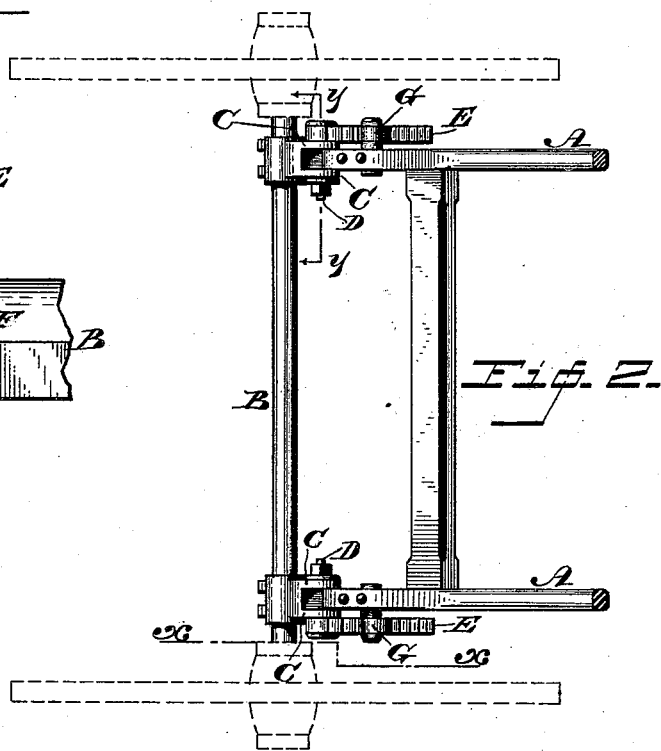
WITNESSES:
L. Douville,
P. H. Jagle.
INVENTOR:
William A. Fegeley
BY Joshua Biederwheim
ATTORNEY.

UNITED STATES PATENT OFFICE.

WILLIAM A. FEGELEY, OF PHILADELPHIA, PENNSYLVANIA, ASSIGNOR OF ONE-HALF TO THOMAS D. HORN, OF SAME PLACE.

SHAFT-SUPPORT.

SPECIFICATION forming part of Letters Patent No. 426,991, dated April 29, 1890.

Application filed November 22, 1889. Serial No. 331,157. (No model.)

*To all whom it may concern:*

Be it known that I, WILLIAM A. FEGELEY, a citizen of the United States, residing in the city and county of Philadelphia, State of Pennsylvania, have invented a new and useful Improvement in Shaft-Supports, which improvement is fully set forth in the following specification and accompanying drawings.

My invention consists of a shaft-support formed of a ratchet and pawl which are attached, respectively, to the running-gear and shaft, so as to hold the latter in desired positions, as will be hereinafter set forth.

Figure 1 represents a partial side elevation and partial vertical section on line $x\ x$, Fig. 2, of a shaft-support embodying my invention. Fig. 2 represents a top or plan view thereof. Fig. 3 represents a vertical section on line $y\ y$, Fig. 2, on an enlarged scale. Fig. 4 represents a side elevation of a detached portion. Fig. 5 represents a side elevation of another detached portion.

Similar letters of reference indicate corresponding parts in the several figures.

Referring to the drawings, A designates the shafts of a vehicle, which are connected with the axle B by means of the ears C and bolts D after the manner of shaft or thill couplings. One of the openings of each pair of ears C is squared or angular, and the contiguous portions of the bolts D are similarly shaped, so that rotation or turning of said bolts is prevented.

E designates segmental racks or ratchets, which are fastened on the bolts D, it being noticed that the eyes or opening F of said ratchets are angular to accord with the angular portions of the bolts D, whereby the ratchets are prevented from turning.

G designates dogs or pawls, which are hung on the shafts A, so as to engage with the teeth of the ratchets. Pressing against the pawls are springs H, which are suitably connected with the shafts and serve to keep the pawls in engagement with the ratchets. To said pawls are also attached sliding rods J, which are guided on the shafts A and provided with handles K, whereby the pawls may be readily disengaged from the ratchets. It will be seen that the shafts A may be held in different elevated positions by the pawls and ratchets relatively to requirements, either to relieve the animal of weight of the shafts or place the shafts out of the way when not required, it being evident that the shafts may be lowered as usual, the pawls in this case being duly withdrawn from the ratchets.

While I show a ratchet and pawl on each side of the shafts, it is evident that one set of the same may be dispensed with.

Having thus described my invention, what I claim as new, and desire to secure by Letters Patent, is—

1. A yoke with an ear having openings therein, one of which is angular, a connecting-bolt with an angular end, a segmental rack fitted on the angular end of the bolt, and a pawl adapted to be hung on a shaft and engage with said rack, all combined substantially as described.

2. Ears adapted to be secured to an axle, one having an angular opening, a bolt having an angular end, a segmental rack on said angular end, a pawl adapted to be hung on a shaft and engaging with said rack, and a rod adapted to be guided on the shaft connected with said pawl, the parts being combined substantially as described.

WILLIAM A. FEGELEY.

Witnesses:
JOHN A. WIEDERSHEIM,
A. P. JENNINGS.